United States Patent [19]
Adachi et al.

[11] Patent Number: 5,170,081
[45] Date of Patent: Dec. 8, 1992

[54] GROUND ISOLATION CIRCUIT

[75] Inventors: Hiroo Adachi; Mitsuo Nakazato; Kouzo Nozawa; Toshiro Araki; Mutsuro Tanoue; Mitsumasa Watanabe, all of Saitama, Japan

[73] Assignee: Pioneer Electronic Corporation, Tokyo, Japan

[21] Appl. No.: 781,902

[22] Filed: Oct. 24, 1991

[30] Foreign Application Priority Data

Jan. 31, 1991 [JP] Japan ................ 3-29095

[51] Int. Cl.⁵ ............................ H04B 15/00
[52] U.S. Cl. ..................... 307/520; 307/491; 307/494; 381/13; 381/94
[58] Field of Search ........... 307/491, 494, 540, 520, 307/542; 381/13, 93, 94, 180

[56] References Cited

U.S. PATENT DOCUMENTS

| | | | |
|---|---|---|---|
| 3,353,035 | 11/1967 | Dent | 307/520 |
| 3,593,042 | 7/1968 | Cook, Jr. | 307/261 |
| 3,612,905 | 10/1971 | Cook, Jr. | 307/254 |
| 3,755,745 | 8/1973 | Sapir | 307/520 |
| 3,760,198 | 9/1973 | Mori et al. | 307/491 |
| 4,155,041 | 5/1979 | Burns et al. | 381/94 |
| 4,746,871 | 5/1988 | de la Plaza | 307/494 |
| 4,868,881 | 9/1989 | Zwicker et al. | 381/94 |
| 5,051,628 | 9/1991 | Hanna | 307/520 |

*Primary Examiner*—Andrew J. James
*Assistant Examiner*—Terry D. Cunningham
*Attorney, Agent, or Firm*—Sughrue, Mion, Zinn, Macpeak & Seas

[57] ABSTRACT

The present invention relates to a ground isolation circuit for use in connecting electronic circuits at the pre-stage and the post-stage having signal lines assigned for a plurality of channels, wherein the interconnection of the two electronic circuits is performed by employing a shielded signal cable for each channel, discrete ground terminals are provided at either of the electronic circuits, one for each channel, and thereby each shielding braid of the shielded signal cable is connected independently to the discrete ground terminal with every channel. Accordingly, no loop circuit is formed through the shielding braids, thus resulting in no induced noise even if there is an interlinkage of external radiation noise with the shielding braids.

6 Claims, 6 Drawing Sheets

GROUND ISOLATION CIRCUIT

BACKGROUND OF THE INVENTION

1. Field of the Invention

This invention relates to a ground isolation circuit for electronic circuitry and, more particularly, to a ground isolation circuit for isolating a plurality of signal channels such as in motor vehicle-mounted stereophonic sound equipment.

2. Description of the Prior Art

In motor vehicle-mounted stereophonic sound equipment to be encountered with enormous noise radiations, it is common to employ shielded cables for wiring discrete electronic circuits, such as a compact disc (CD) player and a main amplifier, and shielding braids of the shielded cables are grounded to the ground of each electronic circuit at both ends in order to protect the electronic circuits from external noise.

The external noise may be eliminated by connecting the electronic circuits with shielded cables, as mentioned above, however, this may cause another problem, a so-called "ground loop noise", in such shielding system, since a ground loop is formed by the grounded shielding braids between the connected electronic circuits and, if there is a difference in ground potential, a loop current may flow through the formed ground loop.

Accordingly, to eliminate the ground loop noise caused by the ground potential difference between the connected electronic circuits, in case the connection of which is done by employing the shielded cables, a differential amplifier is normally interposed at the input side of the electronic circuit at the post-stage, as a component of the ground isolation circuit, for isolating the grounds of the connected electronic circuits from each other.

Referring to FIG. 1, there is shown, for example, a prior-art-type ground isolation circuit for use in connecting CD player unit with an amplifier in a motor vehicle-mounted stereophonic sound equipment. As known, there are a number of noise radiating sources in the motor vehicle, such as an engine, an ignition system, a microcomputer for controlling the vehicle and the like, and radiated external noises are easily picked up by a wire harness installed within a body of the motor vehicle for connecting discrete electronic units.

Consequently, a RCA cord 5, comprising elements of which are shielded independently by shielding braids 4L and 4R, has been employed in such motor vehicle wiring for transmitting left (L) and right (R) channel signals of the stereophonic sound through shielded signal lines of 3L and 3R.

In FIG. 1, the signal line 3L of the RCA cord 5 for the L channel signal is wired between an output terminal L1 of the L channel signal of the CD player unit 1 and an input terminal L2 of the L channel signal of the amplifier unit 2. In like manner, the signal line 3R of the R channel is wired between an output terminal R1 of the R channel signal of the CD player unit 1 and an input terminal R2 of the R channel signal of the amplifier unit 2. Further, the shielding braids 4L and 4R of the RCA cord 5 are combined, respectively, into one braid at the both sides of the CD player unit 1 and amplifier unit 2 and are grounded respectively to the ground terminals G1 and G2 of the units 1 and 2.

On the other hand, differential amplifiers 6L and 6R, such as operational amplifiers, are interposed between the L channel signal input terminal L2 and the ground terminal G2 of the amplifier unit 2 and between the R channel signal input terminal R2 and the ground terminal G2, respectively, constituting a so-called ground isolation circuit. In FIG. 1, resistors 7 through 14 are biasing resistors for each differential amplifier.

In the example shown in FIG. 1, for the ease of understanding, the CD player unit 1 is shown symbolically by simply designating signal sources 15L and 15R and inner resistors 16L and 16R for the L and R channels. However, it is apparent for those skilled in the art that a photo pick-up unit, head amplifiers and the like are included in the CD player unit 1.

Stated hereinafter is a summary of the reason why the ground loop noise is generated in the circuit of FIG. 1.

If a potential difference of Vn is generated between the grounds of the CD player unit 1 and the amplifier unit 2 for any reason, loop currents may flow through the signal lines 3L and 3R, and the shielding braids 4L and 4R based on the generated potential difference Vn. The loop current that flows through each loop circuit has the same phase and is called a common mode current. In general, the cause of the noise is not the common mode current, but a normal mode current of opposite phase. Since the current phase of the common mode current is in phase, cancellation takes place within the current loop, thus resulting in no ground-loop noise.

In an actual circuit arrangement, however, it is common that impedances of the signal lines 3L and 3R and the shielding braids 4L and 4R differ from each other. Because of this fact, if electronic circuits at the pre-stage and the post-stage are connected without taking any measures against the noise problem, a difference in the common mode current is transferred into a normal mode, and which noise in turn enters into the signal lines as the ground loop noise.

To eliminate the problem encountered by the ground loop noise, it has been proposed, as shown in FIG. 1, that differential amplifiers 6L and 6R are interposed between the signal terminals and ground terminals of the respective channels in the electronic circuit at the post-stage, and each channel signal is applied between a non-inverted input terminal (+) and an inverted input terminal (−) of each differential amplifier. In this circuit arrangement, an amount of the common mode current that flows through the signal line 3L will be identical to that of the shielding braid 4L and that an amount of the common mode current that flows through the signal line 3R will be identical to that of the shielding braid 4R. Therefore, by subtracting the common mode current from the other having the same value at respective differential amplifiers 6L and 6R, it is possible to cancel out the amount of difference between the common mode currents that flow through the signal lines and the shielding braids. In this way, there will be no transfer of the common mode current to the normal mode current, this in turn prevents the ground loop noise from occurring.

As seen in FIG. 1, however, if the electronic circuits at the pre-stage and the post-stage are connected by utilizing shielded connecting cables, such as the RCA cord 5 wherein every cable is shielded independently for each channel, there will be formed a DC loop by the shielding braid 4L for the L channel and the shielding braid 4R for the R channel. Therefore, if an external radiation noise interlinks with this DC loop, there will be induced a noise current that circulates the DC loop as shown by the arrow in FIG. 1.

A voltage caused by the induced noise current is then added in series with a voltage across the input terminals (+) and (−) of each of the differential amplifiers 6L and 6R, and acts upon the differential amplifiers to cause them to circulate the normal mode currents. Consequently, there has been a problem such that the induced noise by the normal mode current enters into the signal line for each channel as an interfering noise. This phenomenon causes a serious problem for motor vehicle-mounted audio equipment.

It is therefore an object of this invention to eliminate the problems encountered by the prior art ground isolation circuits and to provide a ground isolation circuit capable of preventing an induced noise by external radiation noises even when inter-connections are made between two electronic circuits at the pre-stage and the post-stage by employing shielded connecting cables for respective channels such as a RCA cord.

SUMMARY OF THE INVENTION

In order to achieve the objective, the present invention provides a ground isolation circuit for use in connecting electronic circuits having signal lines assigned for a plurality of channels. More specifically, the ground isolation circuit embodying the present invention is for use in connecting two electronic circuits at the pre-stage and the post-stage. The interconnection of the two electronic circuits is performed by employing a shielded signal cable for each channel, whereas discrete ground terminals are provided at either of the electronic circuits, one for each channel, and thereby the ground terminals are separated from each other. Each shielding braid of the shielded cable for each respective channel terminated at the electronic circuit, on which the discrete ground terminals are provided, is connected independently to the respective ground terminal.

In accordance with the present invention, since the shielding braid of the shielded cable for each channel is grounded independently to one of the discrete ground terminals provided at either of the electronic circuits, no loop circuit is formed through the shielding braids as in the prior-art-type ground isolation circuit. This in turn results in no generation of induced noise even if there is an interlinkage of external radiation noise with the shielding braids.

BRIEF DESCRIPTION OF THE INVENTION

DETAILED DESCRIPTION OF THE PREFERRED EMBODIMENTS

Figure 1:
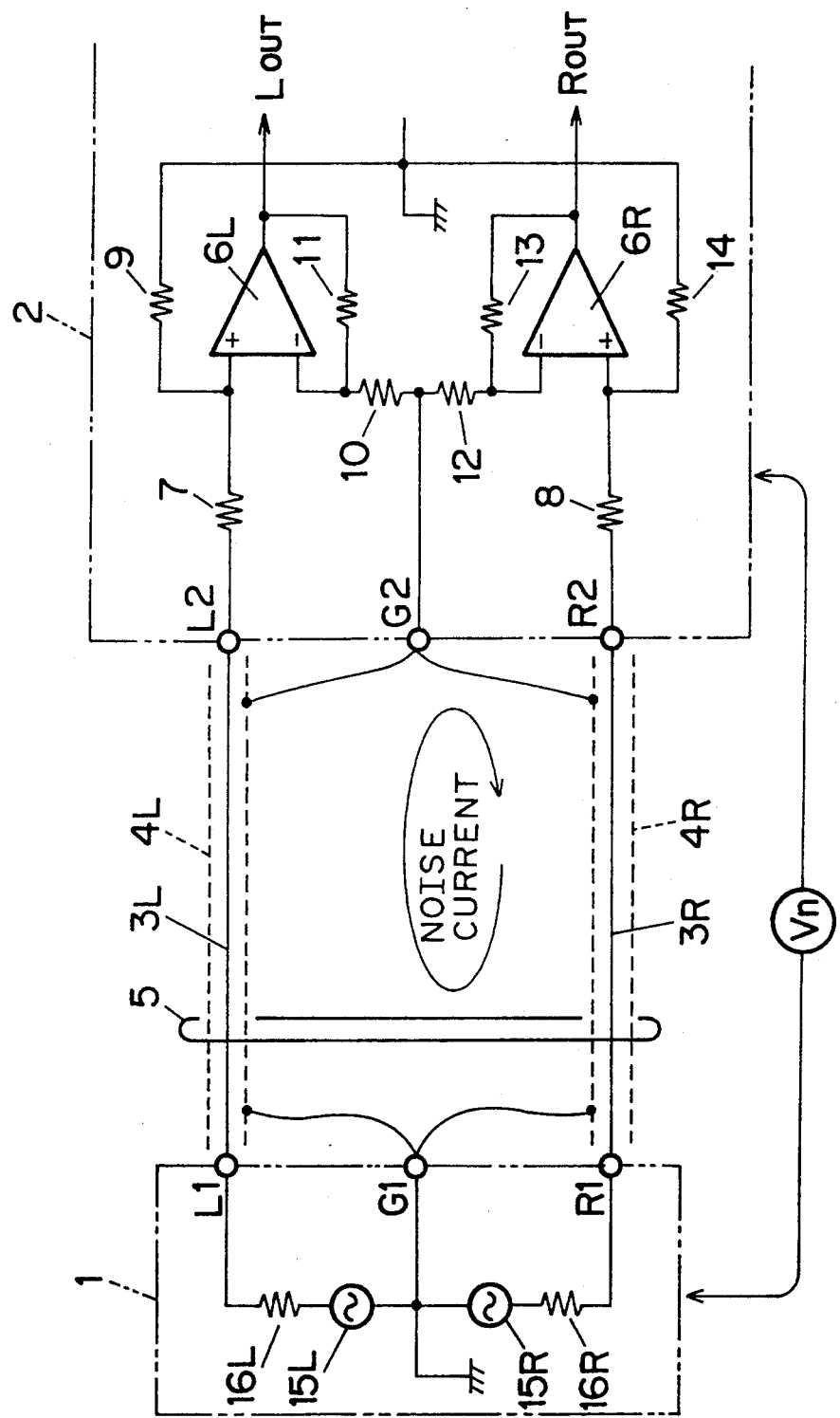
FIG. 1 is a circuit diagram showing a prior-art-type ground isolation circuit.
Figure 2:
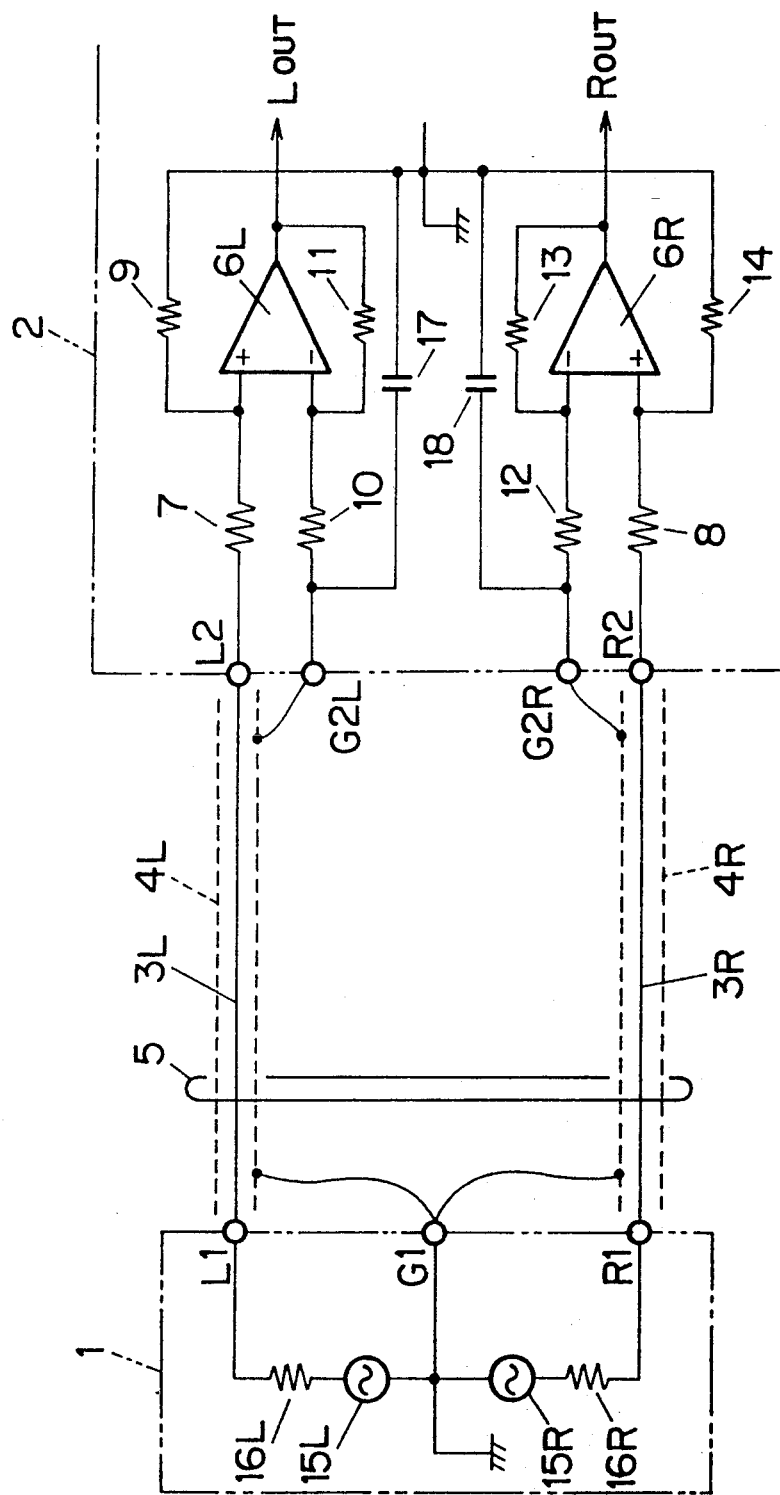
FIG. 2 is a circuit diagram showing an embodiment of this invention.

Referring now to FIG. 2, there is shown a ground isolation circuit which is the first embodiment of this invention. In this first embodiment, a ground terminal G2 (see FIG. 1) of an amplifier unit 2 at the post-stage is divided into two discrete ground terminals G2L and G2R in a sense of DC for providing one independent ground terminal for each signal channel. As seen, the shielding braid 4L of the L channel shielded cable is connected to the ground terminal G2L of the L channel while the shielding braid 4R of the R channel shielded cable is connected to the ground terminal G2R of the R channel, wherein like numerals designate like elements of FIG. 1 and no further description for the composing elements will be made.

According to the circuit arrangement as described above, the ground loop, that has been formed in the prior-art-type ground isolation circuit through the shielding braids of the L and R channel shielded cables, is now cut off at the discrete ground terminals G2L and G2R. In this way, the induction of noise current by the external radiation noise can be effectively prevented from causing.

Moreover, by interposing by-pass capacitors for high frequencies between the ground terminals G2L and G2R and the ground of the amplifier unit 2, a high frequency noise superimposed on the shielding braids 4L and 4R can effectively be grounded to the ground of the amplifier unit 2, thus resulting in further decrease of unwanted noise.

Figure 3:
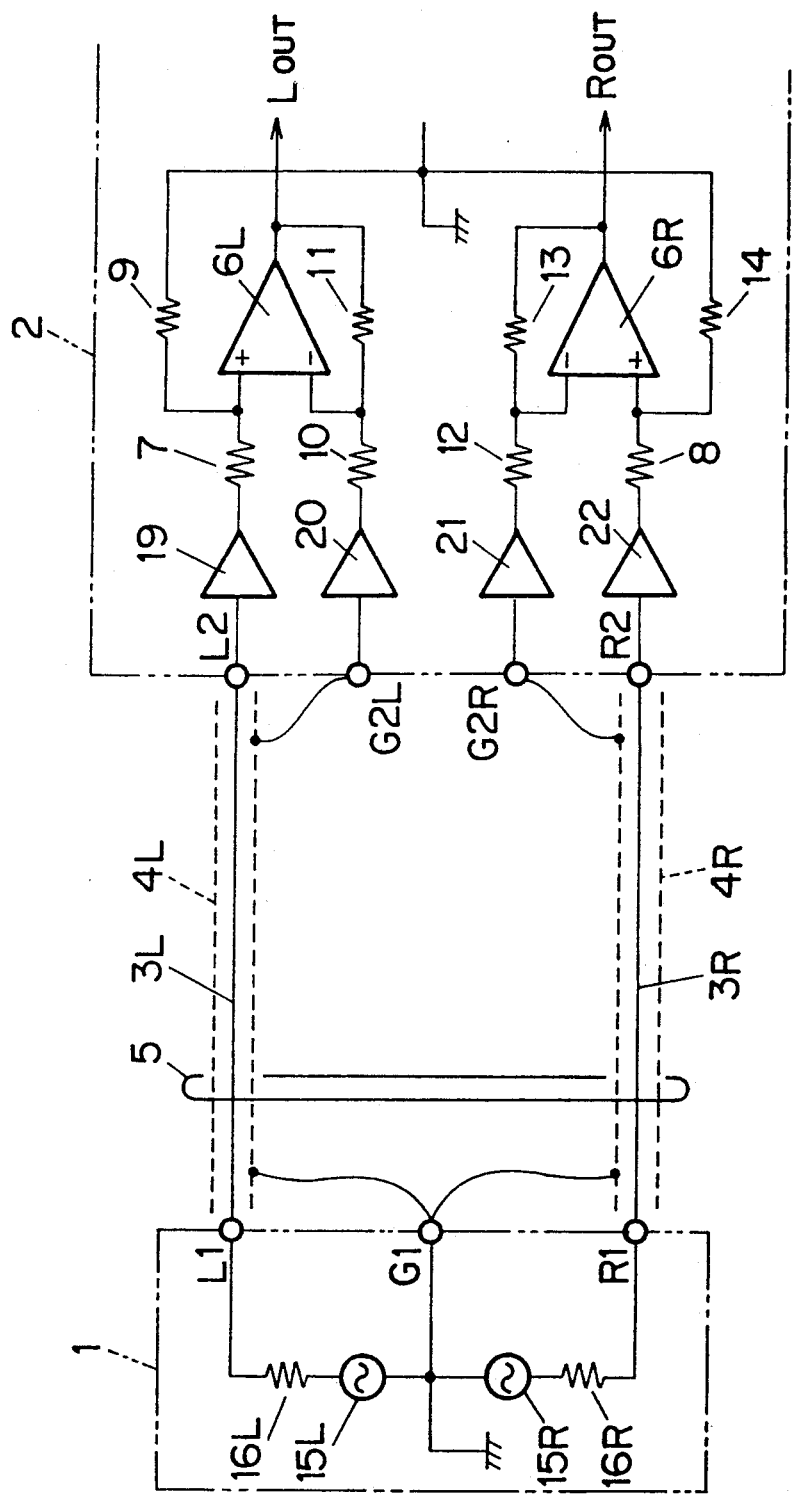
FIG. 3 is a circuit diagram showing another embodiment of this invention.

In FIG. 3, there is shown another ground isolation circuit as the second embodiment of this invention. This second embodiment has the same configuration as that of the first embodiment of FIG. 2 except buffer amplifiers are interposed between the signal input terminals L2 and R2 and the ground terminals G2L and G2R of the amplifier unit 2. According to this embodiment, it is possible to isolate the first stage of each signal line from the second stage thereof by making use of the high impedance characteristic of each buffer amplifier for providing more effective suppression of the induced noise.

Figure 4:
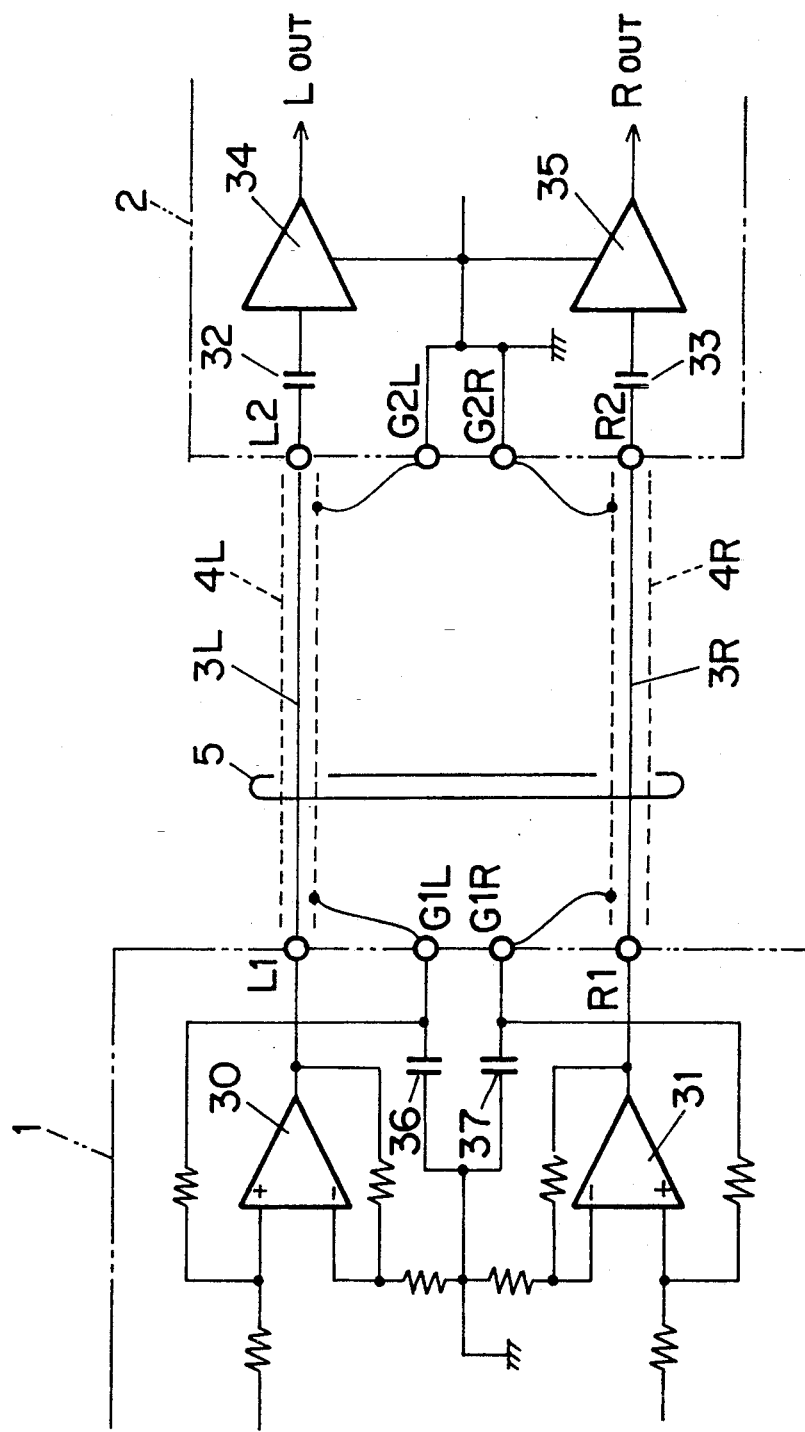
FIG. 4 is a circuit diagram showing a further embodiment of this invention.

In FIG. 4, there is shown another ground isolation circuit as the third embodiment of this invention. In this embodiment, differential amplifiers are provided at the pre-stage unit instead of the post-stage unit for allowing the pre-stage unit to transmit only AC components of line signals to the post-stage unit.

That is, the differential amplifiers 30 and 31 for use in sending out signals are provided in unit 1, and the output signals of these differential amplifiers 30 and 31 are sent to input amplifiers 34 and 35 contained in unit 2 through coupling capacitors 32 and 33. The ground terminals of both units 1 and 2 are then divided into two groups of terminals G1L, G1R and G2L, G2R for every channel, and both shielding braids 4L and 4R are grounded independently, at both ends, to the ground terminals provided for each channel in each unit. Further, the ground terminals G1L and G1R are connected to the ground of the unit 1 through high frequency-by-pass capacitors 36 and 37 for providing a high frequency grounding, and then high frequency noises superimposed on the shielding braids 4L and 4R are also grounded.

Figure 5:
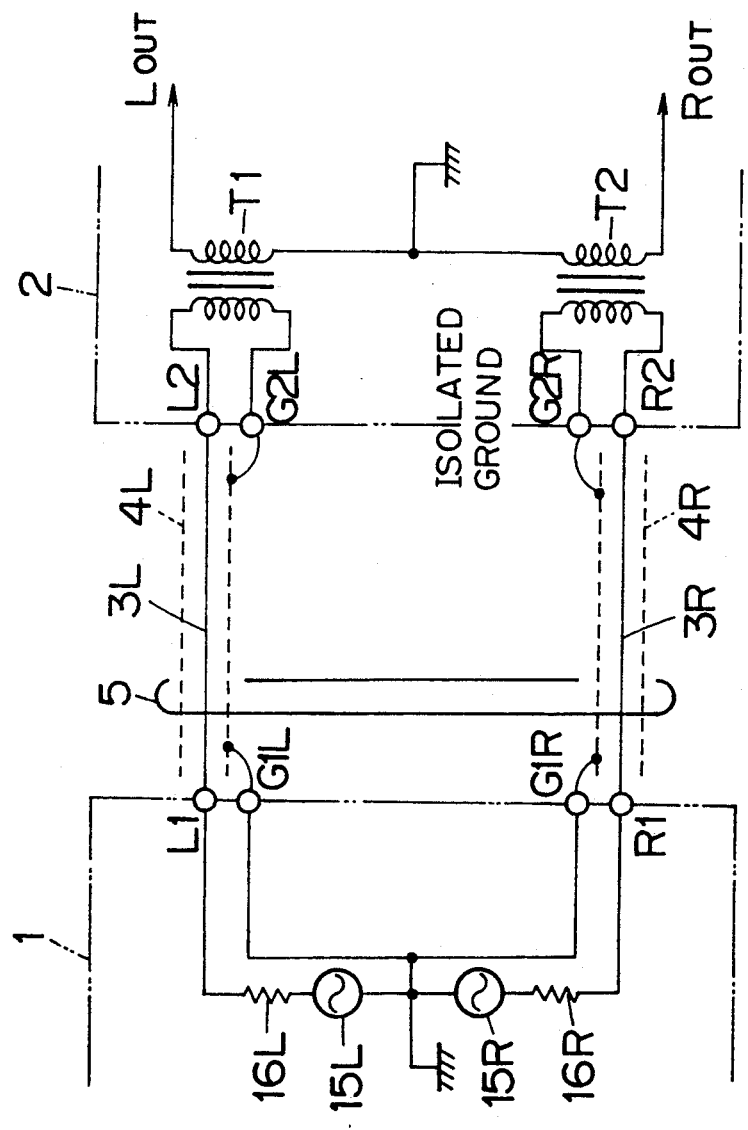
FIG. 5 is a circuit diagram showing a still further embodiment of this invention.
Figure 6:
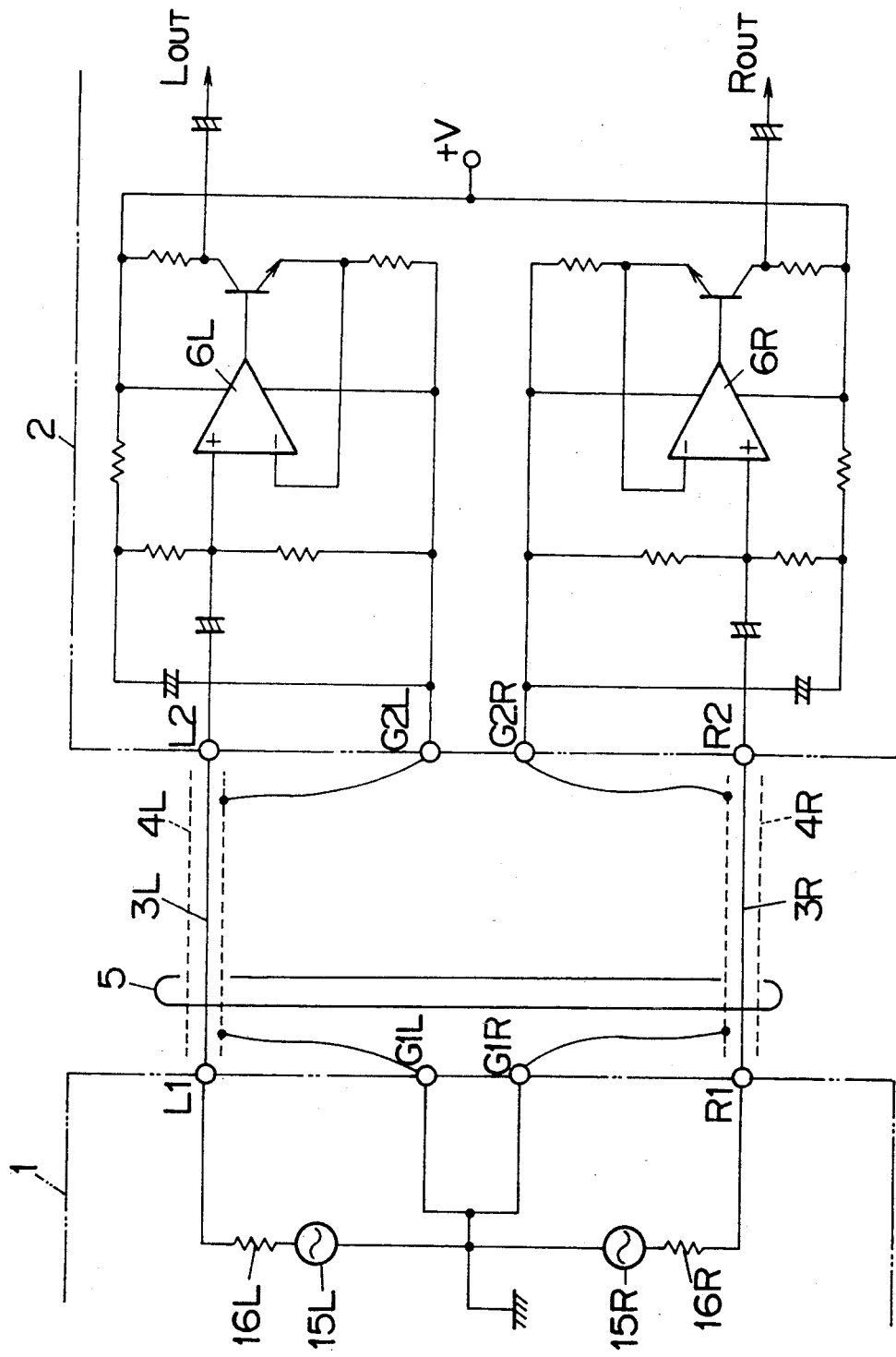
FIG. 6 is a circuit diagram showing a further embodiment of this invention.

Further modifications of the present invention are shown in FIGS. 5 and 6. In FIG. 5, there is shown a transformer isolator type ground isolation circuit embodying the present invention while, in FIG. 6, there is shown a current feed back type ground isolation circuit embodying the present invention.

As it has been described hereinabove by referring to the two electronic circuits such as the CD player unit and the amplifier unit therefor, however, it will be appreciated that the present invention is not restricted to the particular embodiments that have been described and illustrated, and that variations may be made by applying, for example, to the connection between two amplifiers.

Accordingly, it is to be understood by those skilled in the art that the foregoing descriptions are made only for illustration and that various changes and modifications may be made in the invention without departing from the scope of the invention as defined in the appended claims and the equivalents thereof.

What is claimed is:

1. A ground isolation circuit for electronic circuits having a plurality of signal channels, wherein two electronic circuits, one constituting a pre-stage and the other constituting a post-stage, are connected by means of a plurality of shielded signal lines each having a shielded braid, such that each shielded signal line corresponds to a respective one of said plurality of signal channels, being characterized in that:

either of said two electronic circuits is provided with a plurality of discrete ground terminals, corresponding to each of the plurality of signal channels;

wherein each shielding braid of each of said shielded signal lines is connected to a respective one of said plurality of discrete ground terminals at the electronic circuit provided with said plurality of discrete ground terminals.

2. A ground isolation circuit as defined in claim 1, further including a plurality of differential amplifiers in the electronic circuit constituting the post-stage, such that a non-inverting terminal of each of said plurality of differential amplifiers is connected to a respective one of said plurality of shielded signal lines, and an inverting terminal of each of said plurality of differential amplifiers is connected to a respective one of said plurality of discrete ground terminals.

3. A ground isolation circuit as defined in claim 2, wherein the plurality of said discrete ground terminals are connected to the ground of the electronic circuit at the post-stage through high frequency-by-pass capacitors.

4. A ground isolation circuit as defined in claim 2, further including a plurality of buffer amplifiers, each respective input of said buffer amplifiers in a first set of buffer amplifiers is connected to a respective one of said plurality of shielded signal lines and each respective output of said buffer amplifiers in said first set of buffer amplifiers is connected to a non-inverting input terminal of one of said plurality of differential amplifiers, and each respective input of said buffer amplifiers in a second set of buffer amplifiers is connected to a respective one of said plurality of discrete ground terminals and each respective output of said buffer amplifiers in said second set of buffer amplifiers is connected to an inverting input of one of said plurality of differential amplifiers.

5. A ground isolation circuit as defined in claim 1, further including a plurality of differential amplifiers in the electronic circuit constituting the pre-stage, each having its non-inverting input connected to a respective one of said plurality of discrete ground terminals, and its output connected to a respective output terminal of one of said plurality of shielded signal lines.

6. A ground isolation circuit as defined in claim 5, wherein the plurality of said discrete ground terminals are connected to the ground of the electronic circuit at the pre-stage through high frequency-by-pass capacitors.

* * * * *